(12) United States Patent
Hutchins (10) Patent No.: US 10,385,797 B2
(45) Date of Patent: Aug. 20, 2019

(54) LINEAR MOTOR VALVE ACTUATOR SYSTEM AND METHOD FOR CONTROLLING VALVE OPERATION

(71) Applicant: SentiMetal Journey, Inc., South San Francisco, CA (US)

(72) Inventor: Richard H. Hutchins, South San Francisco, CA (US)

(73) Assignee: SENTIMETAL JOURNEY LLC, Reno, NV (US)

( * ) Notice: Subject to any disclaimer, the term of this patent is extended or adjusted under 35 U.S.C. 154(b) by 34 days.

(21) Appl. No.: 15/656,461

(22) Filed: Jul. 21, 2017

(65) Prior Publication Data

US 2017/0321620 A1 Nov. 9, 2017

Related U.S. Application Data

(63) Continuation-in-part of application No. 14/642,670, filed on Mar. 9, 2015, now Pat. No. 9,739,229, which
(Continued)

(51) Int. Cl.
| | |
|---|---|
| *F01L 9/04* | (2006.01) |
| *F02D 41/26* | (2006.01) |
| *F16K 31/06* | (2006.01) |
| *F02D 41/34* | (2006.01) |
| *F02D 41/14* | (2006.01) |
| *H01F 7/18* | (2006.01) |
| *F01L 1/34* | (2006.01) |

(Continued)

(52) U.S. Cl.
CPC .............. *F02D 41/263* (2013.01); *F01L 1/34* (2013.01); *F01L 9/04* (2013.01); *F02D 41/1401* (2013.01); *F02D 41/345* (2013.01); *F16K 31/0655* (2013.01); *F16K 31/0658* (2013.01); *F16K 31/0675* (2013.01); *F16K 31/0679* (2013.01); *H01F 7/066* (2013.01); *H01F 7/18* (2013.01); *F01L 2009/0403* (2013.01); *F01L 2009/0407* (2013.01); *F01L 2009/0478* (2013.01); *F02D 2041/001* (2013.01)

(58) Field of Classification Search
CPC ... F01L 9/04; F01L 2009/0478; F02D 41/263; F02D 41/1401; F02D 2041/001; F16K 31/0675
USPC .................................. 123/90.11; 251/129.15
See application file for complete search history.

(56) References Cited

U.S. PATENT DOCUMENTS

| | | |
|---|---|---|
| 2,411,734 A | 11/1946 | Kerwin |
| 4,009,695 A | 3/1977 | Ule |

(Continued)

FOREIGN PATENT DOCUMENTS

| | | |
|---|---|---|
| JP | 2000-199411 | 2/2000 |
| SE | 534436 | 8/2011 |

OTHER PUBLICATIONS

Paden et al., Electromagnetic Valve Apparatus with Nonlinear Spring, U.S. Patent Application Pub. US 2015/0108381, Apr. 23, 2015. (Year: 2015).*

(Continued)

*Primary Examiner* — Ching Chang
(74) *Attorney, Agent, or Firm* — Fountainhead Law Group P.C.

(57) ABSTRACT

A linear motor actuated valve assembly in which a linear motor enables electrical actuation and control of intake and exhaust valves of an internal combustion engine.

11 Claims, 7 Drawing Sheets

Related U.S. Application Data is a continuation of application No. 13/963,764, filed on Aug. 9, 2013, now Pat. No. 9,109,714, which is a continuation-in-part of application No. 13/290,353, filed on Nov. 7, 2011, now abandoned.

(51) Int. Cl.
*H01F 7/06* (2006.01)
*F02D 41/00* (2006.01)

(56) References Cited

U.S. PATENT DOCUMENTS

| | | | |
|---|---|---|---|
| 4,794,890 | A | 1/1989 | Richeson, Jr. |
| 5,188,336 | A | 2/1993 | Graner et al. |
| 5,572,961 | A | 11/1996 | Schechter et al. |
| 5,598,814 | A | 2/1997 | Schroeder et al. |
| 5,609,134 | A * | 3/1997 | Schmidt ............... F01L 13/06 123/322 |
| 5,775,276 | A * | 7/1998 | Yanai .................. F01L 9/04 123/90.11 |
| 5,873,335 | A | 2/1999 | Wright et al. |
| 5,983,847 | A | 11/1999 | Miyoshi et al. |
| 6,047,672 | A | 4/2000 | Hanai et al. |
| 6,247,431 | B1 | 6/2001 | Toriumi |
| 6,293,303 | B1 | 9/2001 | Mori et al. |
| 6,318,312 | B1 | 11/2001 | Bauer et al. |
| 6,321,701 | B1 | 11/2001 | Vorih et al. |
| 6,390,443 | B1 | 5/2002 | Katayama et al. |
| 6,397,797 | B1 | 6/2002 | Kolmanovsky et al. |
| 6,666,178 | B1 | 12/2003 | Keller et al. |
| 6,729,279 | B1 | 5/2004 | Lundqvist et al. |
| 6,736,092 | B2 | 5/2004 | Borean et al. |
| 7,047,919 | B2 | 5/2006 | Morin et al. |
| 7,225,770 | B2 | 6/2007 | Simpson |
| 7,392,774 | B2 | 7/2008 | Magner et al. |
| 7,869,929 | B2 | 1/2011 | Sugihara |
| 7,878,480 | B2 | 2/2011 | Vattaneo et al. |
| 8,056,541 | B1 | 11/2011 | Nick |
| 8,087,392 | B2 | 1/2012 | Swanbon et al. |
| 8,374,769 | B2 | 2/2013 | Moriya |
| 8,402,742 | B2 | 3/2013 | Tripathi et al. |
| 8,402,942 | B2 | 3/2013 | Tripathi et al. |
| 2002/0145124 | A1 | 10/2002 | Kabasin et al. |
| 2003/0168030 | A1 | 9/2003 | Muraji |
| 2004/0031455 | A1 | 2/2004 | Muraji |
| 2004/0113731 | A1 | 6/2004 | Moyer et al. |
| 2005/0126521 | A1 | 6/2005 | Simpson |
| 2006/0213467 | A1 | 9/2006 | Roeschle et al. |
| 2007/0044741 | A1 | 3/2007 | Daniel |
| 2007/0295291 | A1 | 12/2007 | Uercho |
| 2011/0234210 | A1 | 9/2011 | Hayashi et al. |
| 2012/0167849 | A1 | 7/2012 | Hutchins et al. |
| 2012/0291727 | A1 | 11/2012 | Keller et al. |
| 2013/0098337 | A1 | 4/2013 | Carlson et al. |

OTHER PUBLICATIONS

Search Report and Written Opinion for PCT/US2014/049953, dated Feb. 10, 2015, Applicant, SentiMetal Journey LLC (16 pages).
Baldor, "Servo, Linear & Motion Control Products Catalog" [online], Apr. 28, 2011, Retrieved from the Internet Archive: http://stevenengineering.com/Tech.sub.--Support/PDFs/92SERVO.sub--LINEAR-.sub.--Motion.pdf, (56 pages).
MD Forhad Khandaker, Voice Coil Actuated Variable Valve Timing System for Spark Ignition Engines, Mar. 2006, Concordia University, Montreal Quebec Canada, Department of Mechanical and Industrial Engineering, (171 pages).
Autozine Technical School, Continuous Variable Valve Lift (CVVL), http://www.autozine.org/technical.sub.--school/engine/vvt.sub.--5.html, Jan. 1, 1997, (6 pages).
Edgar, Julian, BMW's Valvetronic! the first petrol engine without a throttle butterfly? http://www.autospeed.com/cms/A.sub.--111539/article.html, Jan. 1, 2001, (2 pages).
European Patent Office Communication pursuant to Article 94(3) dated Mar. 27, 2018, for European Application No. 14834447.6 1007, Applicant, SentiMetal Journey LLC (4 pages).
Wikipedia article on linear motors: https://en.wikipedia.org/wiki/Linear_motor; printed from the internet on Jan. 23, 2018 (7 pages).
Lin Mot®, a vendor of PM vs coil linear motors: http://www.linmot.com/products/linear-motors/; printed from the internet on Jan. 23, 2018 (5 pages).
Kollmorgen, John Floresta, Oct. 1, 2000; MachineDesign®: http://www.machinedesign.com/linear-motion/driving-linear-motors; printed from the internet on Jan. 23, 2018 (7 pages).
http://www.moticont.com/voice-coil-motor.htm; printed from the internet on Jan. 23, 2018 (1 page).
© 2016 BEI Kimco, http://www.beikimco.com/resources-downloads/about-VCAs/what-is-a-voice-coil-actuator, printed from the internet on Jan. 23, 2018, (3 pages).
http://www.beikimco.com/motor-products/VCA-linear-voice-coil-actuator-all; printed from the internet on Jan. 23, 2018, (2 pages).
Wikipedia article on linear induction motor: https://en.wikipedia.org/wiki/Linear_induction_motor; printed from the internet on Jan. 23, 2018, (2 pages).
© 1994-2018 Aerotech, Inc., https://www.aerotech.com/product-catalog/motors/linear-motor.aspx; printed from the internet on Jan. 23, 2018, (4 pages).
© Copyright 2013 Kollmorgen; https://www.kollmorgen.com/en-us/products/motors/direct-drive/direct-drive-linear/; printed from the internet on Jan. 23, 2018, (1 page).
Maccon; https://www.maccon.de/en/linear-motors.html; printed from the internet on Jan. 23, 2018, (1 page).
Barrett, Jack et al., Parker Hannifin Corporation, "Linear Motor Basics", printed from the internet on Jan. 23, 2018, (8 pages).
Japanese Office Action for JP Application No. 2016-533402, with English translation, dated Jun. 28, 2018, Applicant, SentiMetal Journey, LLC, (6 pages).
Japanese Office Action for JP Application No. 2016-533402, dated Jun. 28, 2018, Applicant, SentiMetal Journey, LLC, (13 pages).
https://newatlas.com/camcon-digital-iva-valve-system/55827/?utm_medium=email&utm_campaign=2018-08-13%20143300%20USA%20Daily%20Basic%202018-08-13%20143956%20Worlds%20first%20fully%20digital%20valves%20open%20up%20 engine%20possibilities&utm_content=2018-08-13%20143300%20USA%20Daily%20Basic%202018-08-13%20143956%20Worlds%20first%20fully%20digital%20valves%20open%20up%20engine%20possibilities+CID_c363d546d8b28da88e5b649db646bb5c&utm_source=Campaign%20Monitor, New Atlas, "World's first fully digital valves open up engine possibilitities," Printed from the internet Aug. 11, 2018, (12 pages).
Chang, W.S., et al., "A New Electromagnetic Valve Actuator," Massachusetts Institute of Technology, Laboratory for Electronic and Electromagnetic Systems, Oct. 24, 2002, (10 pages).
Liu, Jieng-Jang et al., "Electromechanical Valve Actuator with Hybrid MMF for Camless Engine," Proceedings of the 17th World Congress, the International Federation of Automatic Control, Seoul, KR, Jul. 6-11, 2008, Department of Mechanical Engineering, National Taiwan University, Taiwan, pp. 10698-10703, (6 pages).
"Electromechanical Valve Actuator for Variable Valve Timing," updated Jul. 20, 2014, http://www.launchpnt.com/portfolio/transportation/electromechanical-valve-actuator, © 2017 LaunchPoint Technologies Inc., *Magnetic Moments*™ Academic Products, (9 pages).
Wikipedia, "Camless Piston Engine," Printed from the internet on Jun. 1, 2008, https://en.wikipedia.org/wiki/Camless_piston_engine, (9 pages).

* cited by examiner

LINEAR MOTOR VALVE ACTUATOR SYSTEM AND METHOD FOR CONTROLLING VALVE OPERATION

PRIORITY

This application is a continuation-in-part application of U.S. patent application Ser. No. 14/642,670, filed on Mar. 9, 2015, which is a continuation of U.S. patent application Ser. No. 13/963,764, filed on Aug. 9, 2013, which is a continuation-in-part of U.S. patent application Ser. No. 13/290,353, filed on Nov. 7, 2011, now abandoned, which are all incorporated herein by reference in their entirety.

FIELD

The present invention relates generally to valve actuation systems, and more particularly, to linear motor actuated valve trains, and control systems therefore, for internal combustion engines and other applications.

BACKGROUND

Fossil fuels currently power the majority of modern internal combustion engines (ICEs). But hydro-carbon fuels derived from petroleum and other stocks are a scarce resource and the extensive use of such fuels in automobiles is believed by many persons to contribute to undesirable climate change due to the byproducts of combustion. Therefore, there is tremendous pressure to increase the efficiency of the modern internal combustion engine. The demand for increased efficiency is also driven by government quotas, mandates and taxes regarding fuel consumption and $CO_2$ emissions. And this is occurring simultaneously with increasing demands to enhance safety of automobiles, which often increases weight to the detriment of efficiency.

Current steps employed to increase efficiency of ICEs can add considerable cost and complexity while decreasing reliability, power and drivability. For example, there have been numerous attempts to add adjustability to the operation of the intake and/or exhaust valves during the operating cycles of ICEs.

Traditionally the intake and exhaust valves (also referred to as poppet valves) of an ICE have been actuated by one or more camshafts which are mechanically driven from the ICE crankshaft at half engine speed, thereby operating the valves in synchronism with the ICE rotation, and in a fixed phase with one another. It is also known to substitute rotary valves for poppet valves, again mechanically driving the valves from the crankshaft and rigidly slaving the valve operation to ICE crankshaft rotation.

The camshaft profile defines timing of the valve open/close movements. Camshaft design is an exercise in tradeoffs because a given camshaft profile can only be optimized for a very narrow range of crankshaft speeds (measured in rotations per minute (RPMs)). Thus compromises must be made to facilitate easy starting and operation over a broad range of speeds, and these compromises decrease the overall efficiency of the ICE and require great complexity.

Moreover, the mechanical camshaft has a fixed amount of valve movement (lift) and time that the valve is open (degrees of duration). The opening times and closing times of the valves are also rigidly fixed by the mechanical drive systems and camshaft profile. Adding additional camshafts and valves allows optimizing one camshaft/valve system for low speed and the other for high speed, but this still has to be compromised in order to allow easy starting and a broad range of operating speeds.

It is further known that the camshaft(s) may be rotationally advanced and/or retarded with respect to the crankshaft rotational position by various means such as hydraulically bi-directionally rotating the drive mechanism of the camshaft. This is referred to as "phasing" the cam. Phasing facilitates operation of the ICE at various times, temperatures, conditions, loads and altitudes. As is also well known, this form of making adjustments to engine timing may be enhanced further by adjusting valve lift in a variety of ways. However, such systems suffer from heightened complexity. For example, the manufacturing precision required of all of the many parts is heightened, which adds cost and points of failure.

Also, the precise viscosity of the hydraulic fluid required to operate the many parts further adds to costs and expense of maintenance. It is desirable to have the valve actuation systems use engine oil as the required hydraulic fluid for operation. But, even oils meeting current API and SAE specifications may not be precise enough viscosity to meet the requirements of these applications. This necessitates specialized lubricants be used, which limits the motorist's ability to acquire top-up oil, perform their own oil changes, and adds to the cost of automobile maintenance.

Further problems with the camshaft phasing technologies described above are that valve timing, valve duration and valve lift are fixed. These parameters can only be changed slightly and such change requires expensive and complex technology.

Various attempts have been made to overcome the shortcomings of the technologies discussed above and achieve independent valve operating times and duration, most with only partial success. Some, for instance demonstrate valve operation independent of crankshaft position, but suffer from problems inherent to hydraulic operation of the valves due to the cycling of the valve from open to closed in an uncontrolled manner. Such operation is particularly damaging to the valve and valve seat upon the valve closing. Also, the length of stroke of the valve movement (i.e., valve lift) is not variable in this mechanism. Others use an electronically controlled hydraulic system for variable actuation of the inlet and/or exhaust valves of the engine. They use a standard camshaft that is mechanically slaved to the crankshaft of an ICE, but with the additional disposition of an electronically controlled hydraulic lifter between the camshaft and the valve. Through electronic control of the hydraulic fluid into and out of the lifter, the opening and closing time of the valve and the lift of the valve can be controlled to some extent. However, this arrangement is limited to the operation of the mechanically slaved camshaft and, for instance, cannot command a valve to open at maximum lift for a long duration, or at a different time than the camshaft scheduled opening time.

Attempts have been made to make ICE valve operation independent of crankshaft positioning by driving the valves open and shut with direct hydraulic pressure that is applied by electrically controlled valve means. An electrical command is sent by control unit, which receives input from engine and associated system sensors. However, such systems still suffer from significant drawbacks as will be explained below. Some attempt to minimize hydraulic valve controls for the ICE valves and the operation of an ICE using hydraulically operated ICE valves. High hydraulic pressure is used to push the valve in one direction while low hydraulic pressure combines with a balancing spring to cushion and stop the ICE valve movement. The multiple hydraulic valve controls per ICE valve, balancing springs and multiple hydraulic pressures add unreasonable complexity to the system. Further, it is difficult to control valve lift variations with this system. Another approach to hydraulically operated valves in an ICE charges an upper chamber with fluid to close the ICE valve and a lower chamber to open the valve. One drawback with this mode of moving an ICE valve is that the hydraulic fluid control valves can only be in open or closed states. A "throttle" valve may be disposed in the hydraulic line to adjust the total movement (lift) and movement speed of the ICE valve, as the ICE valve moves from open to closed and vice versa. Dampening the hydraulically operated ICE valves can only be achieved by utilizing a complex means to attempt such dampening.

Pneumatic means have also been proposed to actuate the valves independent of the ICE crankshaft position. The systems typically use air directed through electrically operated control valves to push the ICE valves open and shut. A major drawback of such systems is that the ICE valves slam into their limit stops upon opening and also slam into the valve seats upon closing. Such slamming causes mechanical damage to the valves fairly quickly. In some cases springs and other mechanisms have been added to cushion the valves, but these add significant complexity to the valve system.

Yet another attempt to resolve the deficiencies of camshaft-operated valves has been to electrically operate the valves using computer control with some form of solenoid for valve actuation and also a dampening means. A solenoid operates by fully opening and fully closing the device that it acts upon. Solenoids cannot be controlled to move at a variable rate or to vary speed upon opening/closing or to vary opening movement distance (lift). The only way to vary the rate of opening, stopping, closing or movement distance (lift) in a solenoid operated system is with external mechanical devices, which add to the overall complexity of the system. The solenoid arrangement and drawbacks can be understood with reference to examples thereof. Both mechanical springs and fluid shock absorbers have been proposed as cushioning mechanisms None of these have offered any technique for variable lift which is preferable to facilitate easy starting, idling and low speed operation. The dampening techniques proposed are also complex and raise reliability concerns. Some use two solenoids formed on the ICE valve stem, one to open and one to close the valve with the addition of springs on the valve to hold the valve in a nominally closed position. No provision is provided by these inventions for variable lift adjustment of the valve.

Due to the deficiencies of these prior attempts, there remains a need to provide a valve actuation system, method and device for ICEs that reduces cost, weight and complexity, while providing for fully independent control of the valve actuation parameters.

SUMMARY

The present invention addresses certain deficiencies discussed above by providing for a device, method and system of actuating valves using a linear motor to variably control the movement of a valve with a high degree of accuracy and speed. Linear motors will be understood by those skilled in the art to include voice coil motors with fixed coils, moving coils, fixed magnets and moving magnets, single and multiple coils, single and multiple magnets, linear motors using multiple coils and multiple magnets and other types of linear motors, including those called linear actuators and sometimes called tubular linear motors. Valve opening time, opening amount ("lift"), closing time and velocity/acceleration of the valve between closed, open and closed positions, can be constantly varied from stroke to stroke and during a single stroke, if desired. The device and system can be implemented in a relatively small sized package. Moreover, the valve's movement can be controlled by an electronic control unit (ECU). A plurality of sensors around the engine provide feedback to the ECU, which actuates the valve based upon the sensor inputs and rules-based logic programmed in the memory of the computer.

The system, according to one embodiment of the present invention, comprises a linear motor with multiple moving coils attached to the valve stem with multiple fixed magnets that ride inside the coils. The system, according to an alternate embodiment of the present invention, comprises a commercially available linear motor fixedly coupled to the valve stem. The system, according to another alternate embodiment of the present invention, comprises a commercially available linear motor that is mounted under a conventional valve rocker arm and captively coupled to the rocker arm on an internal combustion engine in a position to push or pull the rocker arm to open or close the valve by extending the shaft of the commercially available linear motor and close the valve which is also captively coupled to opposite end of the rocker arm by retracting the shaft. The linear motors, of any of these embodiments, move the valve in response to control from the computer. The valve is movable between the closed position at a selectable first rate of both acceleration and speed to a selectable open position ("lift"), including all position variations between the fully open and fully closed states, then returning to the closed position after a predetermined time ("duration") at a selectable second acceleration and speed that may be reversed as needed for a soft landing on the valve seat. Valve position, velocity and acceleration can be varied both during a valve stroke and from one stroke to the next.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations and applications, or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The linear motor valve actuation assembly and system of the present invention can be configured to operate any poppet-type valve. For example, such valve systems can be employed in process flow control and medical applications, automated fluid filling of vessels and blood pumping, and the like. Another particularly advantageous application is valve actuation for internal combustion engines (ICEs), including both Otto cycle and Diesel cycle engines and variants thereof (e.g., Miller or Atkinson cycle).

The lift, duration and timing of the individual valves in the ICE can be adjusted independently from the crankshaft rotational speed and independent from the actuation of any of the other valves. Thus, for example, an engine with dual intake and/or dual exhaust valves for each cylinder can have each member of the pair of valves open and close with different timing, duration and lift—or even not operate—to achieve desired combustion and exhaust characteristics throughout the entire operational speed range of the engine. The valve opening/closing operations can also be controllably dampened to enhance reliability. The assembly and system is also relatively simple, lightweight and low cost compared to prior attempts at improved valve actuation systems as discussed herein. In one embodiment, the spatial envelope is approximately four inches long and 1.5 inches in diameter. However, other package sizes can be employed without departing from the scope of the invention.

To control valve operation, an electronic control device (such as an electronic valve control unit (ECU) in ICE applications) controls the timing and movement of the valves based upon logic resident in the memory of the control unit. Input variables, as will be discussed below, are provided to the control unit to provide for complex motion control suited to a wide variety of conditions, such as those that would occur in duty cycles of ICEs.

The acts, modules, logic and method steps discussed herein below, according to certain embodiments of the present invention, may take the form of a computer program or software code stored in a tangible machine-readable medium (or memory) in communication with a control unit, comprising a processor and memory, which executes the code to perform the described behavior, function, features and methods. It will be recognized by one skilled in the art that these operations, structural devices, acts, logic, method steps and modules may be implemented in software, in firmware, in special purpose digital logic, and any combination thereof without deviating from the spirit and scope of the present invention as recited within the claims attached hereto.

Figure 1:
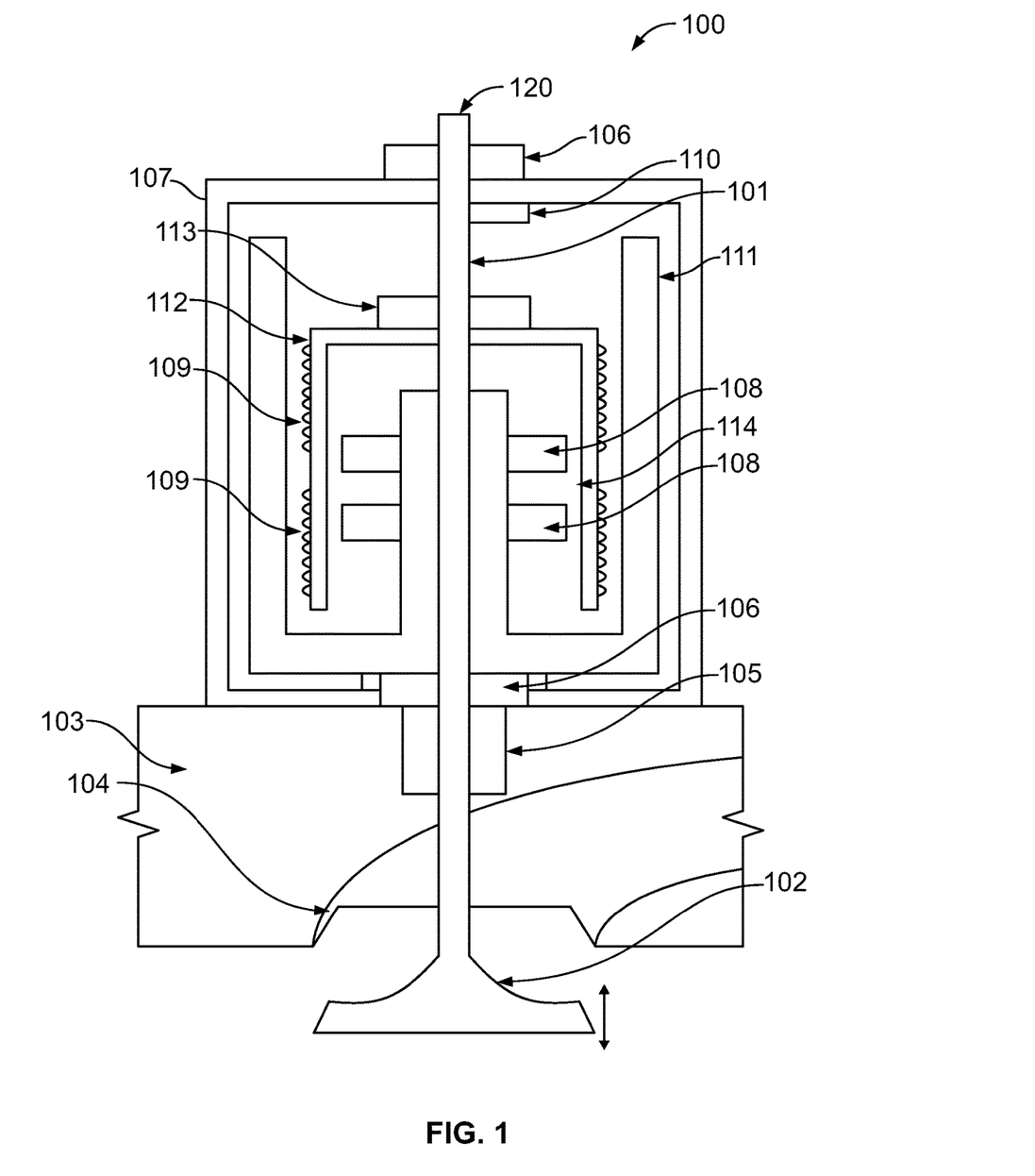
FIG. 1 is a cross sectional side view of a valve assembly according to certain example embodiments.
Figure 2:
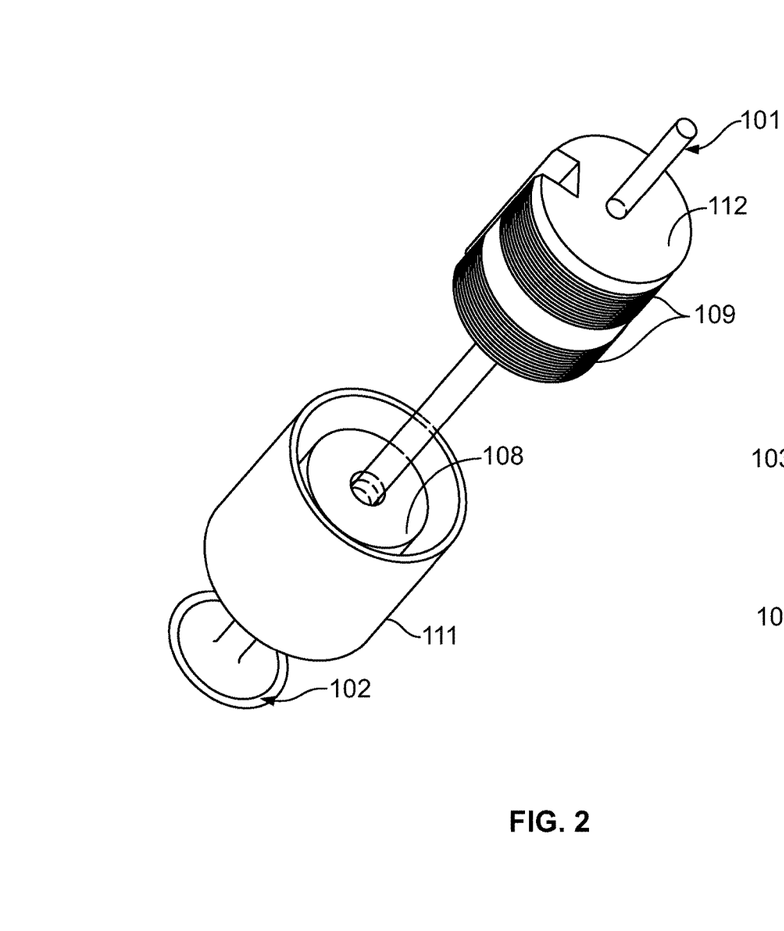
FIG. 2 is a disassembled view of the coils and magnets of the motor assembly according to certain example embodiments.

Referring now to FIGS. 1 & 2, a diagram is provided to illustrate the components of the valve assembly 100 for the head of an internal combustion engine according to one example embodiment of the invention. The valve 120 is a poppet-style valve. It includes a valve head 102 and a stem 101 extending upwardly from the head. These valve portions 102 and 101 are generally, but need not be, integral as a single piece. The stem 101 can be solid or hollow so that it can be filled with another material, such as sodium, to enhance heat transfer.

Other valve train variables can be modified without departing from the scope of the invention, including the length of the valve stem, diameter of the valve head, and magnetic coil sizes and densities.

The valve head 102 is shaped to conform to the valve seat 104 in the head 103 of the ICE so that it seals the corresponding port in the combustion chamber.

A valve guide 105 may be used in the head of the ICE engaging the valve stem to direct and restrain the movement of the valve. In addition to the valve guide 105, upper and/or lower bearings may be used to support the valve assembly. A lower bearing 106 is disclosed above the valve guide. The lower bearing 106 surrounds the stem 101 and further guides the movement of the valve by preventing lateral movement of the stem 101. An upper bearing 106 is disposed more distally up the valve shaft and is configured and functions in the same manner as the lower bearing. Together, the bearings virtually eliminate any lateral movements of the valve and may restrict rotational movement, if desired, as the valve controllably oscillates linearly along the longitudinal axis of the stem as indicated by the arrow on FIG. 1.

A non-magnetic coil form 112 is fixedly attached to the valve stem 101, providing a form for the coil windings 109. Coil form support 113 provides support of the coil form and attachment to the valve stem. The coil windings 109 each comprise a plurality of wire (e.g., copper) windings on the coil form 112. Permanent magnets 108 are fixedly attached to the inner portion of the field housing 111 that is collinear around the valve stem 101, slidably fits around the valve stem 101, is made of a magnetic material (e.g. iron), is attached to the valve assembly housing 107 and thereby to the ICE cylinder head 103. The valve assembly is encased by an outer steel (or other suitable material) housing 107 to protect the assembly. The wiring that comprises the coils can be encased in epoxy or other suitable encapsulant in order to maintain the coils in the desired shape and prevent contamination and oxidization. The coils are connected to the ECU by suitable flexible wires that pass through the housing 107. An air gap 114 is defined between the magnets and the inner surface of the coils 109.

Application of a direct current (DC) voltage to the coils 109 causes the valve 120 to linearly translate in one direction or the other depending on the polarity of the applied voltage as the coils and permanent magnets 108 either attract or repel each other. Reversing the polarity reverses the direction of movement. Also, the current and voltage values applied to the coils can be varied. Thus, the position, velocity and acceleration of the valve can be varied widely by adjusting the voltage, current and polarity inputs to the coils. The ECU can vary these inputs to achieve any desired movement of the valve.

The valve controllably moves between the closed position and desired and varying open positions, which defines the stroke of the valve. In an ICE application, the closed position is defined to be where the valve head is extended upward to seat and close the respective intake/exhaust port in the head. The fully open position is defined to be where the valve head is at its most distant point of travel from the port in the head. Any number of intermediate positions between these end positions can also be achieved with immediate precision by operation of the coil assembly as disclosed herein. And the coil assembly can be selectively energized in order to move the valve at selected times, over selected distances, with selected velocities and with selected acceleration curves, all as determined by the ECU controlling the coils' operation.

The valve assembly as discussed herein is advantageous because the drawbacks of traditional cam-operated drive mechanisms are eliminated. For example, weight, packaging and complexity are reduced. Reliability is greatly increased because many wear components are eliminated. The increased control and adjustability of the valve operation allows the engine to be simultaneously optimized for emissions, idle speed, torque and horsepower through the entire range of possible driving conditions and duty cycles.

The valve drive system disclosed herein provides constant force over the full valve stroke. Strokes can be small with very fast response times (e.g., less than one millisecond). This valve actuation system operates at high speeds with minimal cogging or force ripple with infinite resolution, which separates this total design from other variable cam timing attempts. Variable cam timing only changes the timing not the stroke. The present invention accomplishes both with infinite settings based upon closed loop operation. Closed loop operation couples the linear motor drive with feedback from position and other sensors to supply information to the ECU, which adjusts the valve actuation parameters according to the rules-based logic programmed into the memory of the ECU. Closed loop mode operation need not apply to all embodiments however.

A valve position sensor 110 is disposed along the stem 101 of the valve, such as attached to the inside of the housing 107. The valve position sensor supplies valve position information to the ECU. The position data can be used to calculate the velocity and acceleration of the valve as may be desired by the logic of the ECU. More particularly, the valve position information can be used to calculate the following parameters of operation: 1. Stroke in inches from closed to opened position; 2. Velocity in inches per second from closed to opened position; 3. Acceleration and deceleration in inches per second squared from closed to opened position; 4. Duration in degrees of crankshaft rotation to hold valve open; 5. Stroke in inches from opened to closed position from origin; 6. Velocity in inches per second from opened to closed position; 7. Acceleration and deceleration in inches per second squared from opened to closed position; and 8. Duration in degrees of crank shaft rotation to hold valve closed. Other operational parameters and units of measurement can also be calculated without deviating from the scope of the present invention.

In one example embodiment, the acceleration of the valve can be approximately 320 ft/s$^2$ (98.1 m/s$^2$). The travel of the valve (stroke) can be approximately 0.5 inches (12.7 mm) maximum, and the valve velocity can be approximately 300 inches per second (7.62 m/s). And the resulting time to complete one stroke is approximately 20-30 milliseconds. Of course, other operating parameters can be utilized without departing from the scope of the invention.

The components of the valve assembly 100, in one embodiment, are secured in a housing 107. The housing can be configured as necessary to permit secure mounting of the valve assembly in the desired position and orientation on the ICE head. In alternative embodiments, a mounting flange or mounting means can be disposed on the outer surface of the housing 107.

Figure 3:
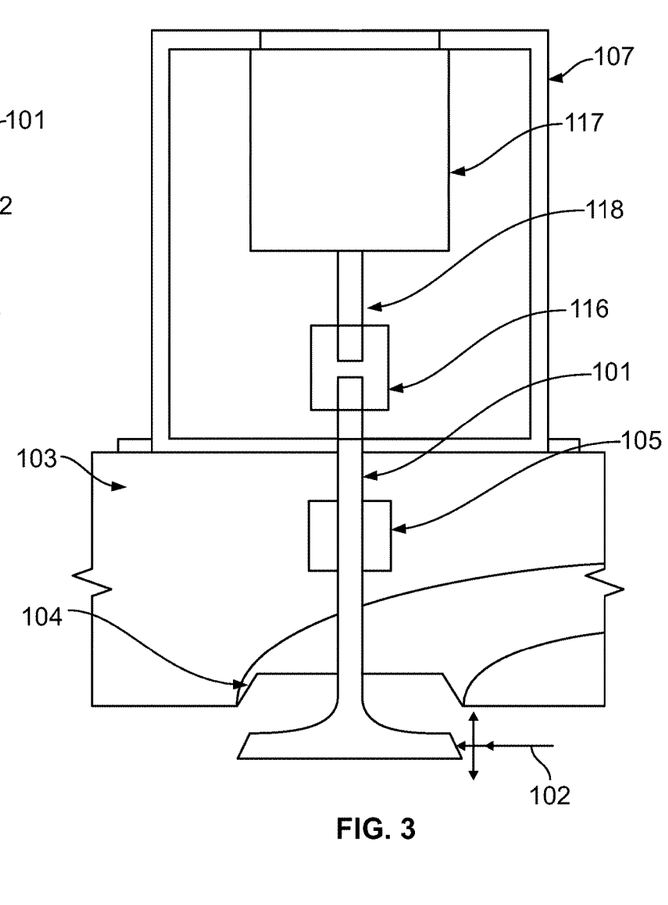
FIG. 3 is a cross sectional side view of a valve assembly that uses a commercially available linear motor according to certain example embodiments.

Referring now to FIG. 3, an alternative embodiment of the current invention is shown that uses a commercially available linear motor 117 to move the ICE valve. The shaft 118 of linear motor 117 is fixedly coupled to the valve stem 101 with coupling 116. The linear motor 117 is mounted to a housing 119 that is suitably attached to the ICE cylinder head 103 such that the shaft 118 of the linear motor is adjacent to and collinear with the valve stem 101 and aligns with the coupling 116. The linear motor 117 contains similar components, including multiple moving coils fixedly attached to a moving shaft 118, multiple fixed magnets, position sensor and flexible wiring that are similar to the valve assembly 100, and operates in the same way with the same drive inputs and position sensor outputs.

Figure 4:
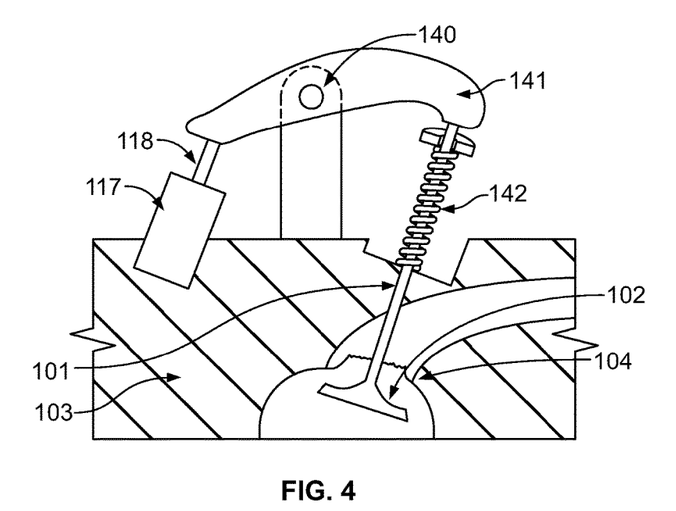
FIG. 4 is a cross sectional side view of a valve assembly that uses a commercially available linear motor with a conventional rocker arm that may be captively coupled at one end to the shaft of the linear motor and at the other end to the valve stem according to certain example embodiments.

Referring to FIG. 4, an alternative embodiment of the current invention is shown that uses a commercially available linear motor 117 to move the ICE valve. The shaft 118 of linear motor 117 is captively coupled to the rocker arm 141 which rocks on pivot pin 140 and captively pushes and/or pulls on the valve stem 101 according to movement by the linear motor. The captive coupling allows the rocking member to push or pull the other member while the rocking member slides across the oscillating member which rides up or down relative to the other. Alternatively, a low pressure conventional valve spring 142 may be placed on the valve stem 100 in conventional fashion, removing the need for the captive connection between the linear motor shaft to the rocker arm, and the valve stem to the rocker arm. The linear motor 117 contains similar components, multiple moving coils fixedly attached to a moving shaft, multiple fixed magnets, position sensor and flexible wiring as the valve assembly 100, and operates in the same way with the same drive inputs and position sensor outputs.

Figure 5:
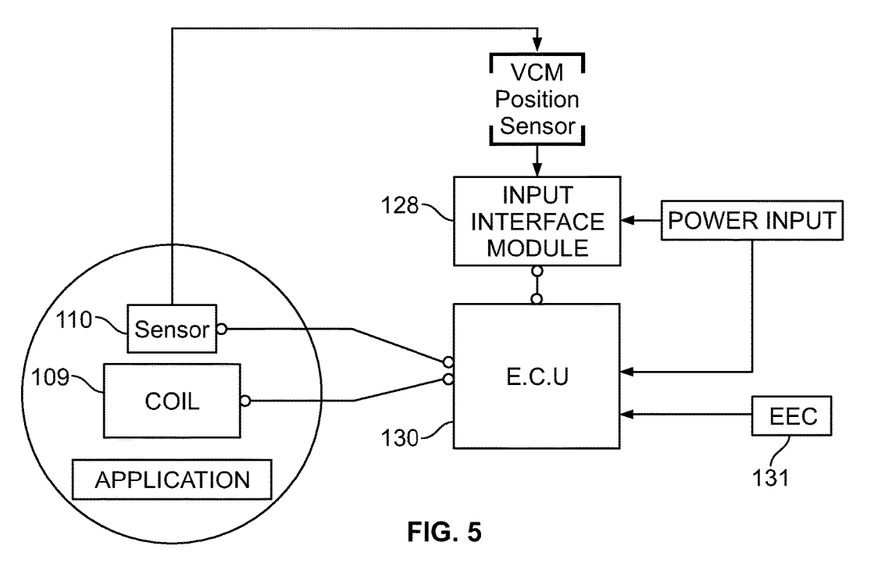
FIG. 5 is a block diagram of the components of a linear valve actuator according to certain example embodiments.

Referring now to FIG. 5, various components of the valve actuation system are illustrated. The output of the position sensor 110 is connected to an input interface module 128 through a VCM position sensor 137, which collects and codes valve position signals from the sensors 110 by valve number for the input interface module 128. The input interface module 128 is a bidirectional signal conditioner and converter from USB format to serial format. The input interface module 128 converts the position sensor information to a signal that is supplied to the ECU 130 where it is used to evaluate control operations for the valves with a signal input from an electrical engine controller 131 (EEC) which has many inputs from engine sensors and controls the engine ignition and fuel.

The ECU 130 comprises a processor, a power driver and memory. The ECU is electrically connected to both the position sensor 110 and the coils 109. The connection to the position sensor 110 powers the sensor. The ECU selectively powers the coils 109 according to inputs from the position sensor, the EEC and the rules-based software code resident in the ECU's memory. As noted above, the ECU selectively energizes the coils 109 to cause the valve 120 to move to a specific position at a specific time, with a specific speed and acceleration. Each of these parameters can be controlled independently for each valve and can also be altered during a single stroke and from one stroke to the next.

For example, the valve can be controllably slowed down (decelerated) just before it reaches the valve seat so that it does not slam into the seat with a great force, which would be inefficient and might damage the valve. This soft seating feature extends the life of the engine compared to prior art valve assemblies that do not adequately dampen the valve's movement. Also, the dampening can be supplied without the need for additional springs or other means to dampen the valve. This reduces weight, complexity and the overall cost of the valve train.

A valve operation sequence might include; applying a first voltage at a first polarity to the moving coils to accelerate the valve in an opening direction at a first opening rate, then applying a second voltage having an opposite polarity to the first polarity to the moving coils to decelerate the valve until it reaches the predetermined open position less than or equal to a fully open position, then holding the valve open for the desired time (duration), then applying a third voltage at a polarity opposite the first polarity to the moving coils to accelerate the valve in a closing direction with a first closing acceleration rate, then applying a fourth voltage having the opposite polarity of the third voltage polarity to the moving coils to decelerate the valve until it reaches a predetermined closing position adjacent a valve seat, and then applying a fifth voltage at a polarity opposite the first polarity to the moving coils such that one or more polarity reversals soft seat the valve and hold it in a closed position.

Figure 6:
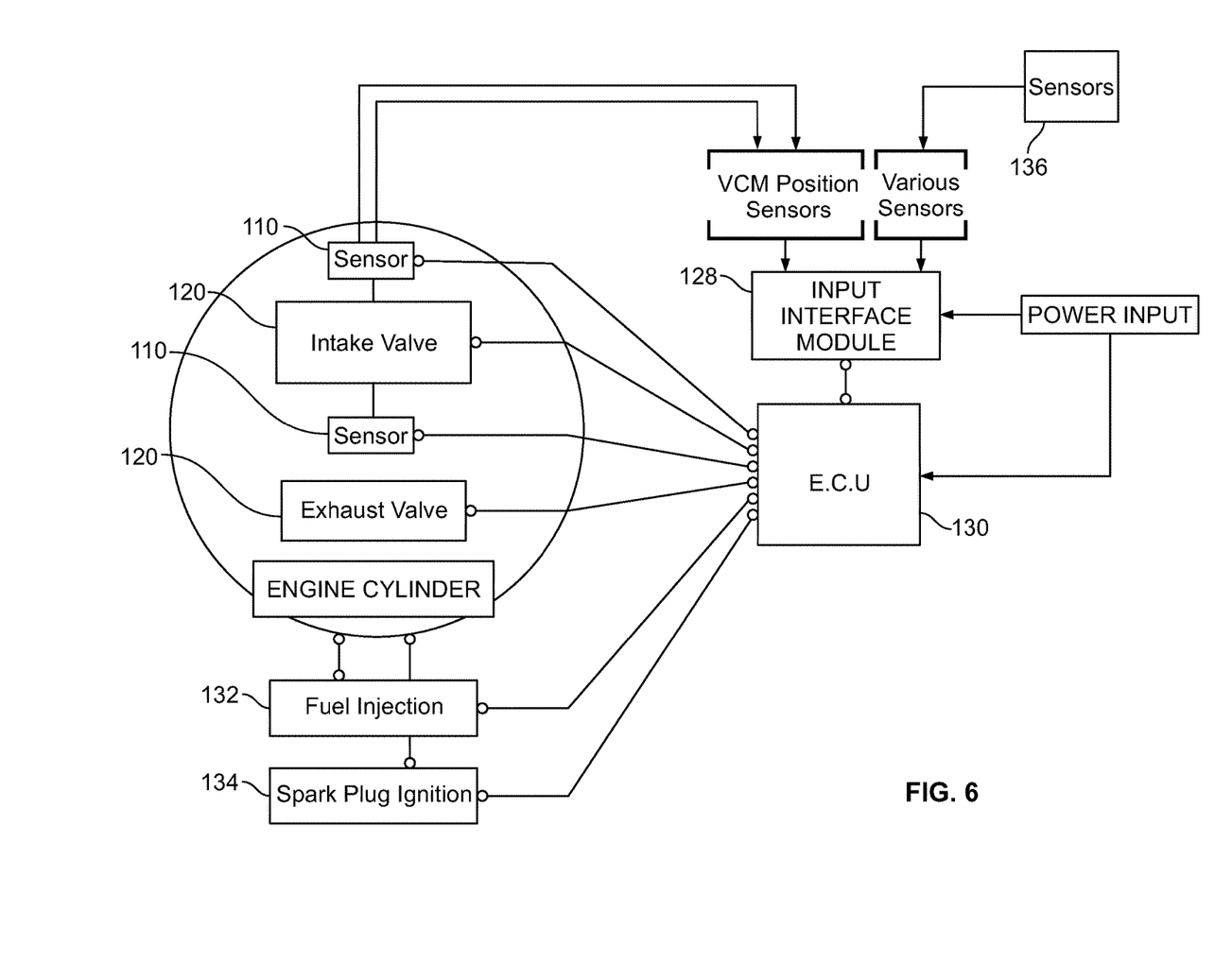
FIG. 6 is a further block diagram of a valve actuation system with EVC control for an ICE, according to certain example embodiments.

FIG. 6 adds additional details to the block diagram of FIG. 5 to illustrate the comprehensive control of engine parameters by an ECU that includes all of the functionality previously residing in the EEC. Here, each of the intake and exhaust valves are controlled by the linear motors as discussed herein. Each valve 120 again includes its own valve position sensors 110. The sensors 110 and valve actuators are each connected to the ECU 130 as discussed previously. Additional engine sensors 136 are also connected directly to the ECU by the Input Interface Module 128. The ECU 130 is additionally operatively connected to the fuel injectors 132 and the spark plug ignition system 134. Thus, the ECU 130 can control the entire combustion event in each cylinder (e.g., air intake, fuel injection, spark and exhaust).

The valve position sensors 110 position information is again collected by an input interface module 128. This module also receives information from additional sensors (collectively 136) disposed throughout the ICE, including for example: crank shaft TDC, exhaust gas temperature; exhaust gas oxygen ratios; input mass air flow; throttle position; barometric pressure; ambient temperature; fuel injector volume and timing; and spark. This information is utilized by the rules-based control logic resident in the ECU 130 to control the characteristics of the valve movement, spark and fuel injection in order to accomplish certain goals, such as efficiency, and power output for a given set of circumstances determined from the information collected by the various sensors noted above. This rules-based approach is far more customizable and adaptable than the more conventional tables-based approach to adjusting parameters in conventional ICEs. The resulting outputs are also far more exact since calculations are performed in real time using real parameters, rather than through predetermined lookup table values.

Figure 7:
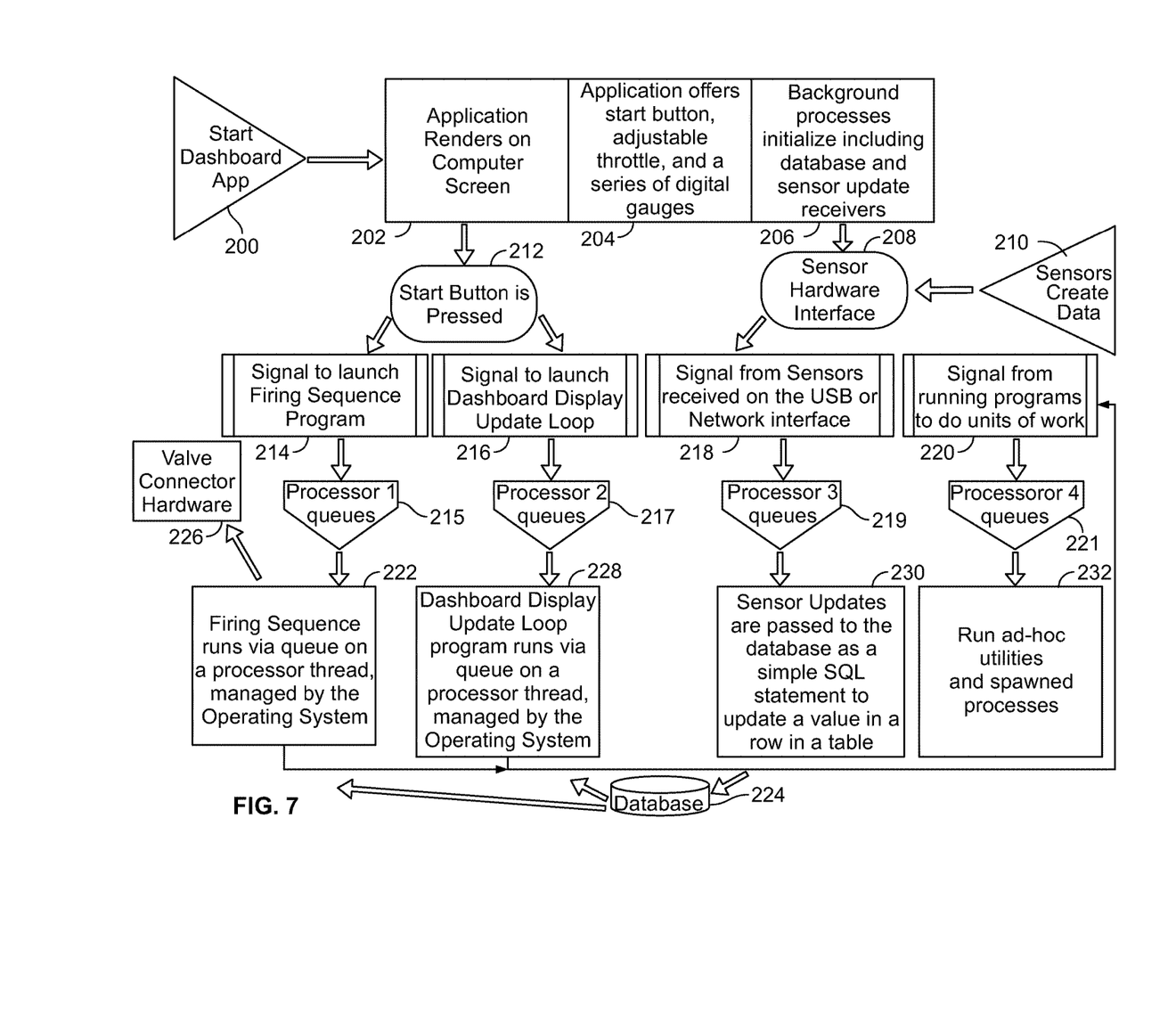
FIG. 7 is a flow chart of software program logic for a linear valve actuator, according to certain example embodiments.

FIG. 7 is a flow chart of the software program logic for a linear valve actuator system, according to certain example embodiments. This can be used by a manufacturer to alter vehicle operating parameters though a graphical user interface in operative communication with the control system during initial design and programming. A diagnostic application 200 is first initiated. The application renders on a graphical user interface 202 for the user to interact with. The application presents a plurality of buttons and gauges to the user 204, including start, throttle control and digital readouts of key operating parameters, such as engine RPM. A plurality of background processes are also begun upon starting the diagnostic application 206, including initializing the database and performing updates of the sensor receivers.

A sensor hardware interface device 208 is provided. It collects the sensor data 210 and converts it to the appropriate format for use by the processor when executing the program logic.

Upon pressing the start button 212, the firing sequence program is launched 214 and the diagnostic application display update is looped 216. Signals from the sensors are received 218 at the network interface or via the serial bus. Moreover, signals are received from running programs to do units of work 220.

Each of process steps 214, 216, 218 and 220 are individually queued in respective processor queues 215, 217, 219 and 221.

The firing sequence logic 214 runs via the queue 215 on the processor as managed by the operating system logic 222. The operating system logic further interfaces with the database 224 as necessary. The valve connector hardware 226 receives the firing sequence data 222 and then can relay valve control signals to the valve actuation means, such as that described herein.

The diagnostic application display update loop logic executes 228 via queue 217 on the processor as managed by the operating system. In step 230, sensor updates are passed to the database 224, as for example SQL statements, to update values in the data table. Also, ad-hoc utilities and spawned processes are managed 232.

The use of the diagnostic application will result in the development of final, production algorithms and look-up tables that are stored in the memory of the computer. The diagnostic application will only be used for development systems. Production systems will hide the diagnostic application and operate automatically. The diagnostic application concept will be available to service technicians with compatible scan tools.

Figure 8:
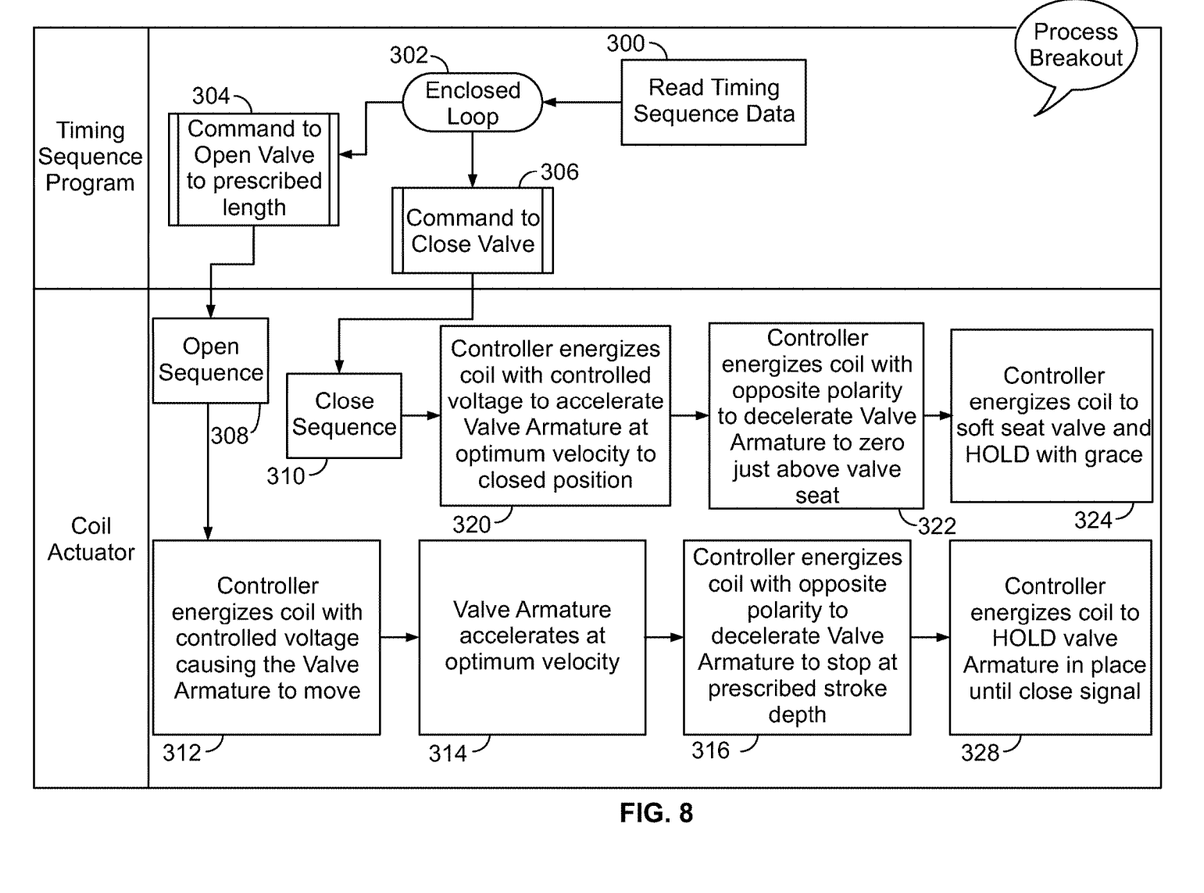
FIG. 8 is a logic diagram of a valve open/close sequence, according to certain example embodiments.

Referring now to FIG. 8, the logic of a valve open/close sequence for a single valve is diagramed. This logic is duplicated for each of the valves in a multi-valve implementation so that each valve can be controlled individually. The valve timing sequence data is read 300 and inputted into a closed control loop 302. The control loop includes commands to open the valve to a prescribed length or height 304, and a command to close the valve 306. If the open valve command 304 is given to the valve actuator, the open sequence 308 is followed by the actuator. If the close valve command 306 is given to the valve actuator, the close sequence 310 is followed by the actuator.

In the open sequence 308, the controller energizes the coil with a first voltage at a first polarity to cause the valve armature (stem 101) to move in a direction away from the valve seat 312. The valve thus accelerates at an initial rate 314. At a predetermined point of travel, the ECU or controller energizes the coil with a second voltage having an opposite polarity 316 to the first polarity to cause deceleration of the valve until the valve stops at a prescribed open position (stroke depth). The controller or ECU then energizes the coil to hold the valve in place until receiving a close signal 318.

In the close sequence 310, the controller energizes the coil with a first voltage at a first polarity to accelerate the valve toward the closed position at a first rate of acceleration 320. At a predetermined point of travel, the controller energizes the coil with a second voltage having an opposite polarity to the first polarity to cause the valve to decelerate to zero at a position just above the valve seat 322. The controller then energizes the coil with a third voltage at a polarity opposite the first polarity to softly seat the valve against its seat and hold the valve in the seated position 324. Alternatively, the soft seating step 324 can be eliminated and the deceleration step 322 can be used to fully seat the valve, at which time the voltage polarity is reversed to hold the valve in the closed position until an open command is received.

Figure 9:
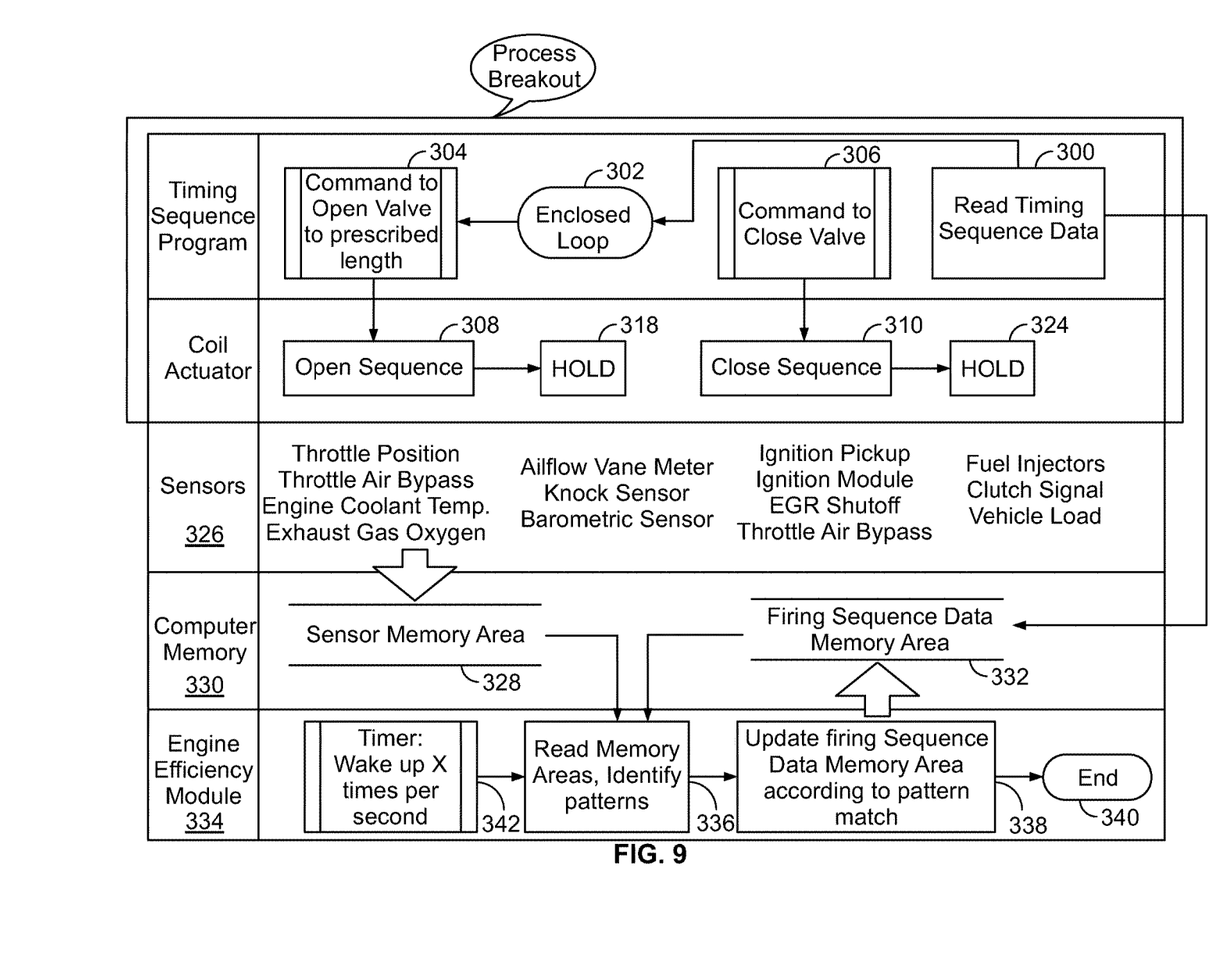
FIG. 9 is a process flow diagram, according to certain example embodiments.

FIG. 9 provides a diagram of portions of the valve actuation process flow from the perspective of several components of an ICE management system, including the valve timing sequence program of the computer, the coil actuator, the sensors, memory and the engine efficiency module (which may be software stored in memory of the computer). The timing sequence program includes the previously-described steps of reading the timing sequence data 300, entering the closed loop sequence 302 to command the valve to open 304, as well as commanding the valve to close 306. The coil actuator logic operation includes the previously-described steps of the open sequence 308, holding the valve open 318, the close sequence 310 and holding the valve closed 324.

As the ICE operates, the plurality of sensors 326 (including throttle position, throttle air bypass, engine coolant temperature, exhaust gas oxygen level, airflow meter, knock sensors barometric sensors ignition pickup, ignition module, exhaust gas recirculation (EGR) shutoff, fuel injectors, clutch, vehicle load, etc.) send their respective data to the sensor memory area 331 of the memory module 330 of the ECU. The firing sequence data 332 is also stored in memory 330.

An engine efficiency module 334 or logic is also included in the computer or as part of a stand-alone module. This module can be formed as executable software code programmed in memory that can be read and executed by a processor included in the computer. The engine efficiency module 334 includes the steps of reading from memory 336 some or all of the sensor data and the firing sequence data. Patterns in the retrieved data are identified and the firing sequence data are updated in the memory area 332 according to the data retrieval and pattern match step 336. The module 334 then ends 340 until woken up 342 periodically. The periodic wakeup signal can be provided by a timer responding to a set time period (e.g., several times per second) or every several revolutions of the crankshaft or every several clock cycles of the computer's processor. The system and logic described above provides for the control device that dynamically adjusts the timing and movement of the valves based upon a wide variety of operating conditions and variables.

Using this system logic, valve position, velocity and acceleration can be varied both during a valve stroke and from one stroke to the next, as controlled by the logic programmed on a memory of the electronic control unit While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A linear motor actuated valve assembly, comprising:
    a housing including a travel aperture defined along a longitudinal axis within the housing, wherein the housing is adapted to be fixably attached to a head portion of an internal combustion engine;
    a valve member including a stem portion movably disposed within the travel aperture and a distal head portion, wherein the distal head portion is adapted to selectively seal a combustion chamber within the head portion of the internal combustion engine;
    a plurality of moving coils including one or more wire windings for each coil and fixably attached to the stem portion of the valve member; and
    a plurality of magnets fixably disposed between the stem portion of the valve member and the plurality of moving coils.

2. The assembly of claim 1, further comprising at least one bearing coupled to the housing and including an aperture collinear with the travel aperture.

3. The assembly of claim 1, further comprising a valve position sensor disposed proximate to the stem portion.

4. The assembly of claim 1, further comprising:
    a control computer; and a power source coupled between the control computer and the plurality of moving coils, and responsive to control commands from the control computer by providing a plurality of controlled power signals;
    wherein
        responsive to the plurality of controlled power signals, the plurality of moving coils correspondingly actuates and causes the stem portion of the valve member to traverse the travel aperture of the housing in first and second directions, and
        the control computer includes one or more processors and memory storing instructions that, when executed by the one or more processors, cause variances in one or more of a position, a velocity or an acceleration of the valve member independently from a crankshaft rotational position during a traversal by the stem portion of the valve member of the travel aperture by controlling the power source to selectively energize the plurality of moving coils with a first polarity to accelerate the valve member in the first direction and a second polarity, opposite to the first polarity, to decelerate the valve member in the second direction.

5. A linear motor actuated valve assembly, comprising:
    a housing including a travel aperture defined along a longitudinal axis within the housing, wherein the housing is adapted to be fixably attached to a head portion of an internal combustion engine;

a valve member including a stem portion movably disposed within the travel aperture and a distal head portion, wherein the distal head portion is adapted to selectively seal a combustion chamber within the head portion of the internal combustion engine; and a linear motor mounted in the housing and including a motor shaft collinear with and fixably coupled to the stem portion of the valve member, and further including a plurality of moving coils including one or more wire windings for each coil and fixably attached to the motor shaft, and a plurality of magnets fixably disposed between the motor shaft and the plurality of moving coils.

6. The assembly of claim 5, further comprising a valve position sensor disposed proximate to the stein portion.

7. The assembly of claim 5, further comprising:

a control computer; and a power source coupled between the control computer and the plurality of moving coils, and responsive to control commands from the control computer by providing a plurality of controlled power signals;

wherein responsive to the plurality of controlled power signals, the plurality of moving coils correspondingly actuates and causes the stem portion of the valve member to traverse the travel aperture of the housing in first and second directions, and the control computer includes one or more processors and memory storing instructions that, when executed by the one or more processors, cause variances in one or more of a position, a velocity or an acceleration of the valve member independently from a crankshaft rotational position during the traversal by the stem portion of the valve member of the travel aperture by controlling the power source to selectively energize the plurality of moving coils with a first polarity to accelerate the valve member in the first direction and a second polarity, opposite to the first polarity, to decelerate the valve member in the second direction.

8. A linear valve actuator system, comprising:

a valve member including a stein portion and a distal head portion, wherein the stein portion is movably disposed within an aperture in communication with a combustion chamber within a head portion of an internal combustion engine, and the distal head portion is adapted to selectively seal the combustion chamber;

a linear motor, fixably mounted to a portion of the head portion external to the combustion chamber and including a motor shaft, and further including a plurality of moving coils including one or more wire windings for each coil and fixably attached to the motor shaft, and a plurality of magnets fixably disposed between the motor shaft and the plurality of moving coils; and a rocker arm, movably mounted to another portion of the head portion external to the combustion chamber and including a first end captively coupled to the stem portion and a second end captively coupled to the motor shaft.

9. The assembly of claim 8, further comprising a valve spring at least partially encircling the stem portion.

10. The assembly of claim 8, further comprising a valve position sensor disposed proximate to the stem portion.

11. The assembly of claim 8, further comprising:

a control computer; and a power source coupled between the control computer and the plurality of moving coils, and responsive to control commands from the control computer by providing a plurality of controlled power signals;

wherein responsive to the plurality of controlled power signals, the plurality of moving coils correspondingly actuates and causes the stem portion of the valve member to traverse the travel aperture of the housing in first and second directions, and the control computer includes one or more processors and memory storing instructions that, when executed by the one or more processors, cause variances in one or more of a position, a velocity or an acceleration of the valve member independently from a crankshaft rotational position during the traversal by the stem portion of the valve member of the travel aperture by controlling the power source to selectively energize the plurality of moving coils with a first polarity to accelerate the valve member in the first direction and a second polarity, opposite to the first polarity, to decelerate the valve member in the second direction.

* * * * *